July 20, 1926. 1,592,905

G. W. ROSS

BRAKE CONTROL MECHANISM

Filed Nov. 3, 1925

Inventor
George W. Ross
By Lyon & Lyon
Attorneys

Patented July 20, 1926.

1,592,905

UNITED STATES PATENT OFFICE.

GEORGE W. ROSS, OF LOS ANGELES, CALIFORNIA.

BRAKE-CONTROL MECHANISM.

Application filed November 3, 1925. Serial No. 66,539.

This invention relates to brake control mechanism and is more particularly directed to a brake control mechanism for use in connection with vehicles or automobiles embodying a planetary transmission and having a transmission brake and rear-wheel brakes.

Many attempts have been made to devise a satisfactory rear wheel braking system for use in connection with a certain type of automobile of large manufacture employing a planetary transmission and a transmission brake to take the place of the planetary transmission brake and which rear-wheel brakes are to be actuated by the brake foot pedal. These attempts have for the most part completely eliminated the use of planetary transmission band brake and have resulted in the provision of the particular type automobile with only one set of brakes and that the foot brakes. While many of these attempts have appeared to be satisfactory, they have for the most part been expensive and required a complete installation of new parts in the motor vehicle separated from and distinguished from the parts of the motor vehicle as provided by the manufacturer.

It is therefore an object of this invention to provide a brake-control system in which the foot pedal is connected to braking mechanisms mounted in connection with the rear wheels, and to provide control connections to the emergency high-gear control levers which are adapted to actuate and set the planetary band transmission brake so that the motor vehicle is provided with a both a hand-emergency brake system and a foot rear-wheel brake system.

Another object of this invention is to provide a brake control system which is inexpensive in construction and installation and which employs a maximum number of parts ordinarily provided by the manufacturer in the particular type of automobile in question.

Other objects and advantages of this invention will be apparent from the following detailed description of a preferred embodiment thereof as illustrated in the accompanying drawings, in which drawings:—

Figures 1, 2:
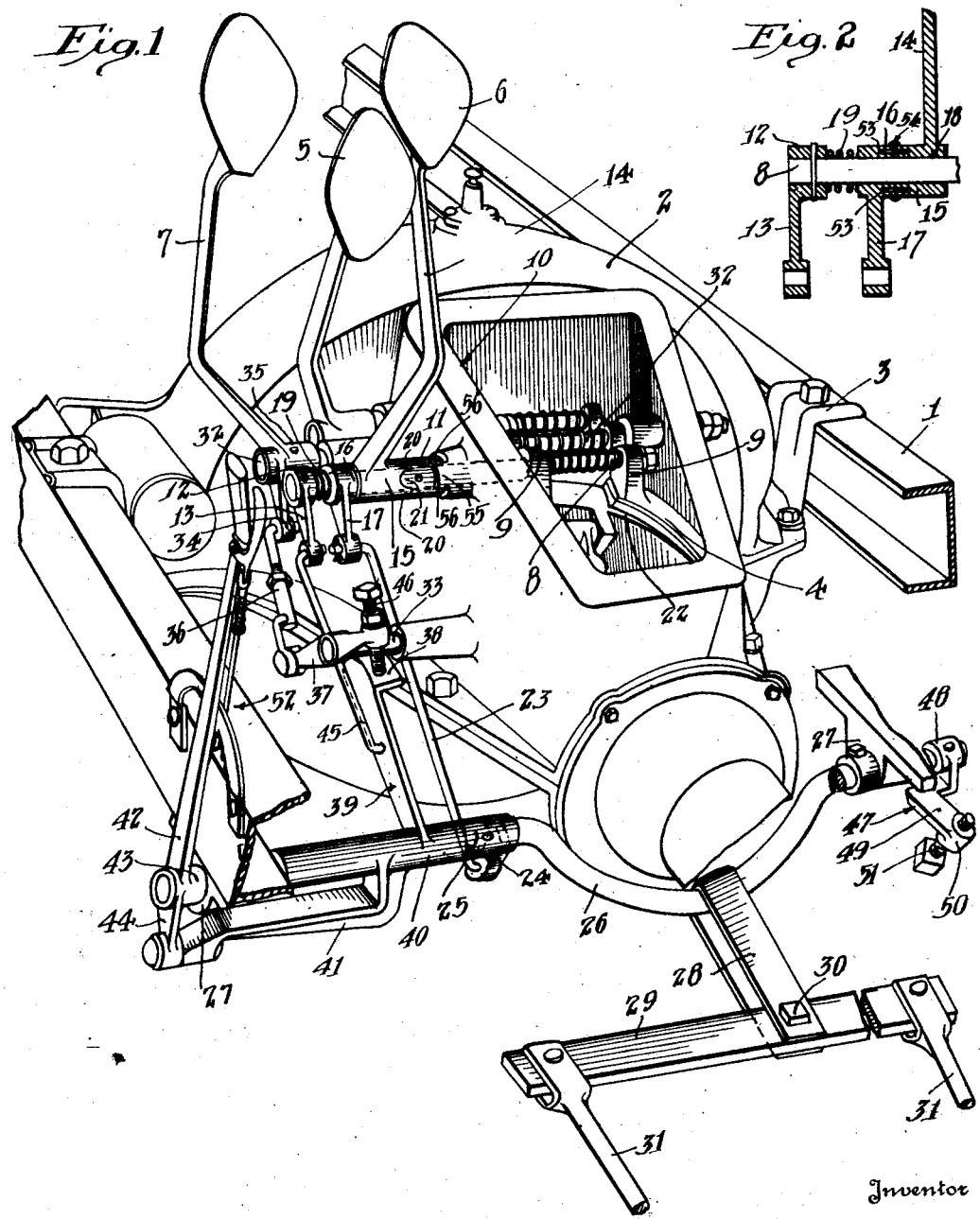
Figure 1 is a perspective view of a brake control mechanism embodying this invention illustrating the same in connection with a fragment of the chassis of a well-known type of automobile.
Figure 2 is an enlarged fragmental side elevation mainly in vertical mid-section of the foot pedal control mechanism.

In the preferred embodiment of this invention illustrated in the accompanying drawings, 1 illustrates longitudinally extending channel irons of a motor vehicle frame. 2 illustrates a fragment of the motor vehicle engine mounted at brackets 3 to the channel irons 1. 4 illustrates the planetary transmission brake band which is of customary and well-known construction employed in automobiles of the type employing planetary transmissions. 5 illustrates a reverse foot pedal control. 6 illustrates the foot pedal adapted according to this invention to control the brake mechanism for actuating the rear-wheel brakes, while the clutch and low-gear control lever are illustrated at 7.

A band brake connecting rod 8 passes through the eyes of the brake band 4 and passes through a bore formed in the gear-housing 10 and is keyed to a dog 11 and to a sleeve 12 of the band brake control arm 13.

The foot pedal 6 is preferably formed integral with the foot brake actuating lever 14 at the end of which lever 14 a cylindrical sleeve 15 is formed, which cylindrical sleeve 15 is secured to the cylindrical sleeve 16 formed at the end of the foot pedal connecting lever 17 as will hereinafter be described. A central bore 18 is formed through the sleeves 15 and 16 and the sleeves 15 and 16 are freely journaled on the rod 8 intermediate the sleeve 12 and the dog 11.

A helical spring 19 yieldably urges the lever 14 along the rod 8 so that the same is maintained in engagement with the outer surface of the dog 11. Complementary lugs 20 are formed on the engaging surface of the sleeve 15 so that when the foot pedal 6 is pushed the lugs 20 ride outward upon the projecting lugs 21 of the dog 11 and compress the helical spring 19 so that the band 4 is not tightened on the drum 22 when the foot brakes are actuated.

A link 23 connects the engaging lever 17 and the rocker-shaft lever 24, which rocker-shaft lever 24 is formed integral with a cylindrical sleeve 25 which fits and is rigidly secured to the rocker-shaft 26. The rocker-shaft 26 is journaled in supporting brackets 27 secured to the channel irons 1. A connecting strap 28 passes over tre rocker-shaft 26 and connects the same with an equalizing bar 29. The strap 28 is secured to the bar 29 at a bolt 30. Brake-rods 31 are connected at the respective ends of the equalizing bar 29 and extend rearward to actuate the brake mechanism (not shown) but which may be of any desired or preferred construction as is well understood in the art.

The low-gear lever 7 is rigidly secured to a rod 32 which actuates the low-gear band of the planetary transmission. This lever 7 also actuates the clutch of the transmission which is enclosed within the housing 10 and is actuated through a shaft 33. The lever 7 has a clutch control arm 34 formed integral with the cylindrical sleeve 35 of the clutch 7 which sleeve 35 is pinned to the rod 32. The control lever 34 is connected through an adjustable link 36 to the clutch actuating arm 37 which is keyed or otherwise secured to the shaft 33.

A cam, or what is commonly termed a speed lever 38, is supported by a speed lever connecting arm 39 formed integral with a sleeve 40. The sleeve 40 is loosely journaled on the rocker-shaft 26. A connecting arm 41 is formed integral with the sleeve 40 and is connected to the emergency brake-control lever 42, which emergency brake control lever 42 is journaled on the rocker-shaft 26 at a cylindrical sleeve 43, which cylindrical sleeve 43 is formed integral with a connecting arm 44. The arm 44 connects the arm 41 and an emergency brake lever 42.

A link 45 connects the speed lever arm 39 and the band control arm 13 so that when the emergency brake lever 42 is pulled rearward, the transmission brake band 4 is tightened on the drum 42 to break the rotation of the drum 22 and hence will hold the vehicle still. At the same time the speed lever 38 engages the adjustable bolt 46 and throws out the clutch. When the brake lever 42 is moved forward the speed lever 38 is rotated to actuate the clutch.

In order to prevent the lever 14 from striking the housing 10 during its forward movement, an adjustable stop 47 is provided. The adjustable stop 47 comprises a sleeve 48 which is secured to one end of the rocker-shaft 26 and has an inwardly projecting arm 49 formed integral therewith at the end of which arm a threaded boss 50 is formed. A lock bolt 51 is screw-threaded through the boss 50 and is adjusted in position so that the end thereof engages the channel iron 1 so as to adjust the limit of movement of the lever 14.

A pawl arm and ratchet are provided of the customary type for setting the emergency brake to maintain the brake band 4 in engagement with the drum 22 when it is desired to set this emergency brake. This pawl and ratchet mechanism is generally indicated at 52.

Referring now to Figure 2, the bosses 15 and 16 are connected together by means of pins 53 which pass through bores formed in the end surfaces of the sleeves 15 and 16 and which pins 53 prevent relative rotation of the levers 14 and 17. In order to prevent relative endwise motion of the sleeves 15 and 16, the sleeves 15 and 16 are brazed or welded together as is indicated at 54. By means of this construction, I am enabled to employ the foot brake lever 14 that is customarily provided in automobiles of the well-known construction employing the planetary transmission and in this way I am enabled to reduce the cost of construction of my brake-control mechanism.

Formed on the housing 10 of the planetary transmission are a pair of engaging lugs 55. Formed on the inner surface of the dog 11 which is keyed to the pinion 8 are a pair of inwardly extending complementary lugs 56 which engage the lugs 55 and pass over the lugs 55 when the emergency brake lever 42 is pulled rearward to actuate the transmission band brake. This mechanism enables me to pull the pinion 8 in a direction transverse to the channel irons 1 which causes the engagement of the band 4 with the drum 22.

Having fully described a preferred embodiment of this invention, it is to be understood that I do not wish to be limited to the specific details herein set forth which may obviously be varied without departing from the spirit of my invention as set forth in the appended claims.

I claim:—

1. In a brake control system, the combination of a foot actuating lever, a hand actuating lever, a rocker-shaft, means journaled on the rocker-shaft and connected to the said hand-lever for actuating a transmission brake, and means rigidly secured to the rocker-shaft for actuating the same and brake bands connected to the rocker-shaft.

2. In a brake control system, the combination of a rocker-shaft, a hand control lever, a sleeve journaled on the rocker-shaft, means connecting the sleeve and the hand control lever, a speed control lever, a band brake control arm, a band brake connecting rod, means connecting the band brake control arm to the band brake connecting rod, and means connecting the speed control lever and the said sleeve.

3. In a brake control system, the combination of a rocker-shaft, a hand-control lever, a sleeve journaled on the rocker-shaft, means connecting the sleeve and the hand-control lever, a brake band connecting rod, a brake band control arm secured to the said connecting rod, means connecting the sleeve and the said control arm, a dog secured to the control rod and having projecting lugs, a pair of complementary stationary lugs adapted to engage the lugs of the said dog on rotation of the said connecting rod to move the connecting rod transversely.

4. In a brake control system, the combination of a foot brake actuating lever, a band brake connecting rod on which the foot brake actuating lever is journaled, a dog secured to the said connecting rod having outwardly extending lugs, complementary lugs formed on a sleeve formed integral with the foot brake actuating lever, a helical spring normally engaging the lugs into engagement, a foot pedal connecting lever secured to the said sleeve, a rocker shaft, a rocker-shaft lever secured to the rocker-shaft, and means connecting the rocker-shaft lever and the said foot pedal connecting lever.

5. In a brake control system, the combination of a rocker-shaft, a sleeve journaled on the rocker-shaft, a hand control lever, means connecting the sleeve and the hand control lever, a speed control lever, a band brake connecting rod, a band brake control arm rigidly secured to the connecting rod, means connecting the band brake control arm to the speed control lever, and means mounted on the band brake connecting rod and adapted to be engaged with complementary stationary means for moving the band brake connecting rod transversely when the said sleeve is rotated.

6. In a brake control system, the combination of a foot actuating lever, a hand-actuating lever, a rocker-shaft, a sleeve journaled on the rocker-shaft and rigidly connected with the hand-control lever, a speed control lever, a band brake connecting rod, means secured to the band brake connecting rod and connected with the speed lever for rotating the band brake connecting rod from the said hand-actuating lever, and means mounted on the band brake connecting rod for causing the said band brake connecting rod to move transversely when the said rod is rotated, a sleeve secured to the foot actuating lever and journaled on the said band brake connecting rod, a foot pedal connecting lever secured to the said sleeve, a rocker-shaft lever rigidly secured to the rocker-shaft, and means connecting the rocker-shaft lever and the foot pedal connecting lever.

7. In a brake control system, the combination of a foot brake actuating lever, a band brake connecting rod on which the said foot brake lever is journaled, a foot pedal connecting lever secured to the foot brake actuating lever, a rocker-shaft, a rocker-shaft lever rigidly secured to the rocker-shaft, means for connecting the rocker-shaft lever and the foot pedal connecting lever, and means secured to the rocker-shaft for limiting the forward movement of the foot brake actuating lever.

Signed at Los Angeles, California, this 28 day of October, 1925.

GEORGE W. ROSS.